United States Patent [19]

Gerritsen

[11] Patent Number: 5,375,340
[45] Date of Patent: Dec. 27, 1994

[54] MEASURING DEVICE FOR THE BEND ANGLE OF SHEET-METAL

[75] Inventor: Gerrit Gerritsen, Pampigny, Switzerland

[73] Assignee: Beyeler Raskin S.A., Lausanne, Switzerland

[21] Appl. No.: 138,348

[22] Filed: Oct. 18, 1993

[30] Foreign Application Priority Data

Oct. 20, 1992 [CH] Switzerland .................. 3250/92

[51] Int. Cl.[5] .............................................. B21D 5/00
[52] U.S. Cl. .................................... 33/534; 33/1 N; 72/26; 72/34
[58] Field of Search ............. 33/534, 1 N, 1 PT, 531, 33/532; 72/34, 26

[56] References Cited

U.S. PATENT DOCUMENTS

| 4,131,008 | 12/1978 | Malatto | 72/26 |
| 4,640,113 | 2/1987 | Dieperink et al. | 72/26 |
| 5,285,668 | 2/1994 | Tokai | 72/26 |

FOREIGN PATENT DOCUMENTS

| 0155228 | 9/1985 | European Pat. Off. |
| 0333654 | 9/1989 | European Pat. Off. |
| 2362722 | 3/1978 | France |
| 2379046 | 8/1978 | France |
| 2044199 | 3/1972 | Germany |
| 9112094 | 11/1991 | Germany |
| 8105266 | 6/1983 | Netherlands .................. 33/1 N |

OTHER PUBLICATIONS

Patent Abstracts of Japan JP61129522, published Jun. 17, 1986, to Hitachi Ltd. vol. 010, No. 322.

*Primary Examiner*—Christopher W. Fulton
*Attorney, Agent, or Firm*—Woodard, Emhardt, Naughton, Moriarty & McNett

[57] ABSTRACT

The present invention relates to a measuring device for the bend angle of a metal sheet or plate in a press brake of the type having a reciprocable punch with a sharp bending edge, and a die having two bending edges on either side of a substantially V-shaped groove or channel, the measuring device comprising a rotatory measuring element, the cross-section of which has a circular peripheral part centered around the axis of rotation of the measuring element, and a linear peripheral part which is shorter than the diameter of the circular peripheral part.

8 Claims, 3 Drawing Sheets

5,375,340

MEASURING DEVICE FOR THE BEND ANGLE OF SHEET-METAL

SUMMARY OF THE INVENTION

The present invention relates to a measuring device for the bend angle of a metal sheet or plate in a press brake of the type having a reciprocable punch with a sharp bending edge, and a die having two bending edges on either side of a substantially V-shaped groove or channel, said measuring device comprising a rotatory measuring element, the cross-section of which has a circular peripheral part centered around the axis of rotation of the measuring element, and a linear peripheral part which is shorter than the diameter of said circular peripheral part.

The measuring of the bend angle of a sheet-like workpiece on a press brake is of great importance, since that angle depends on a number of factors inherent in the bending operation which are difficult to control. These are, in particular, the differences in the actual stroke of the edge of the punch with respect to the die, the deformation and the wear of these members, the variations in thickness of the sheet-metal and the differences in the properties of the sheet-metal, such as its resistance against bending and its modulus of elasticity.

The main object of the invention is to provide a device allowing a very precise measure of the bend angle and, in particular, an instantaneous measure thereof during the bending operation, said device being of a mechanically resistant structure, as well as reliable in its operation, easily adaptable to different tools and relatively economic with respect to its cost price and its maintenance.

To achieve this, the device according to the invention comprises a measuring element which has the shape of a flat disc of small thickness as compared to its dimensions in its plane, this disc being mounted in a disc support so as to be capable of rotating over a limited angle, the disc support comprising means for detecting the angular position of the disc and for providing a measuring signal, for example, by electrical, optical or hydraulic means. The device further comprises a die member having two bending edges arranged on either side of a substantially V-shaped groove, the groove and one of the bend edges having a transverse slot allowing the passage of the measuring disc, said disc support being arranged in the die member so as to be capable of effecting a translatory movement between a position in which the central portion of the linear peripheral part of the disc is inside said slot in the neighbourhood of a bending edge and a position in which this central portion is outside the slot. The arrangement is such that the linear part of the periphery of the measuring disc is brought into contact with a portion of the workpiece placed over the bending edges of the die member, so that the angular position of the disc represents the instantaneous bend angle of the workpiece.

According to a particular embodiment of this device, the support of the measuring disc and the die member are arranged for allowing a linear shifting of the support in a direction inclined with respect to a plane common to the two bending edges of the die member.

Preferably, the support of the measuring disc is subjected to the action of return means tending to bring the same into a rest position in which said central portion of the linear peripheral part of the disc is inside the slot, and actuating means are arranged for tending to bring said central portion to the outside of the slot when the measuring takes place.

A portion of the circular peripheral part of the measuring disc can have teeth engaged with a pinion mounted in the disc support and coupled with a sensor of its angular position, said pinion being subjected to the action of a return spring tending to rotate the measuring disc into a position in which the linear part of its periphery extends outside the slot of the die member groove.

The die member is preferably provided with means for blowing air along the edges of the slot in which the measuring disc rotates, namely on both sides of this disc.

A press brake for bending sheet-metal using the measuring device according to the invention can comprise at least two of said measuring devices mounted at locations spaced along the length of the die of the press, the die members of the measuring devices being inserted between adjacent portions of the die of the press in such a way that the V-shaped grooves of the die members of the measuring devices are placed in line with the V-shaped groove of the die of the press.

BRIEF DESCRIPTION OF THE DRAWINGS

Further characteristics, aims and advantages of the invention will appear from the description of a preferred embodiment of the measuring device as set forth hereafter, by way of example, with reference to the attached drawings, in which.

DETAILED DESCRIPTION

Figure 1:
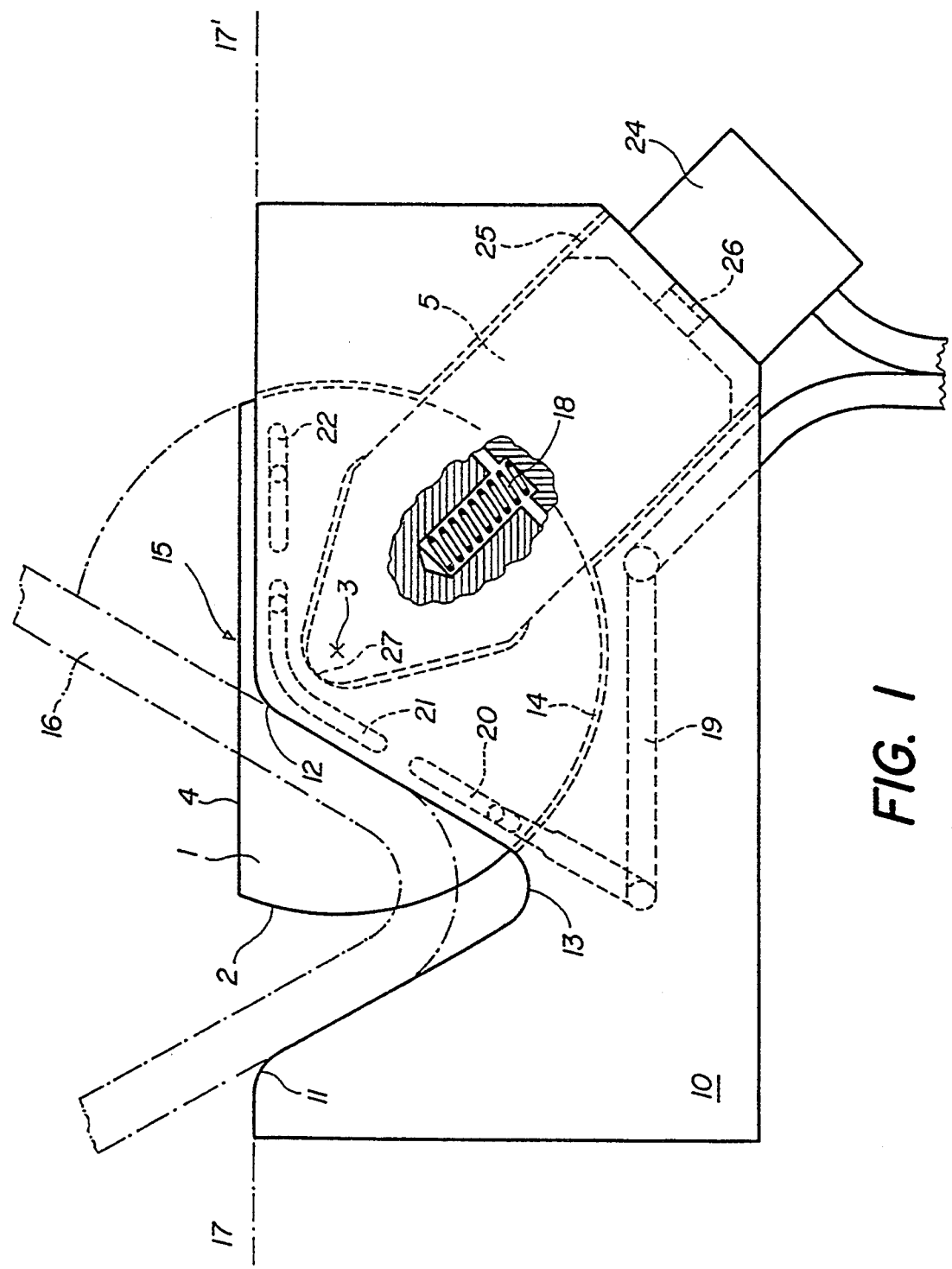
FIG. 1 is a side view of a measuring device according to the invention.

The measuring device shown in FIG. 1 comprises a measuring disc 1, mounted for rotation around an axis 3 in a support 5 shown in dotted lines, this support being itself lodged in a die member 10. The measuring disc has a circular peripheral portion 2, the center of which is situated on the axis of rotation 3, and further has a linear peripheral part 4 which is shorter than the diameter of the circular peripheral part.

The die member 10 comprises a groove 13 which is, for example, V-shaped and the profile of which corresponds to that of the die of the press brake used. The die member 10 comprises, on either side of the groove 13, plane supporting surfaces situated in a common plane 17, 17'.

Figure 3:
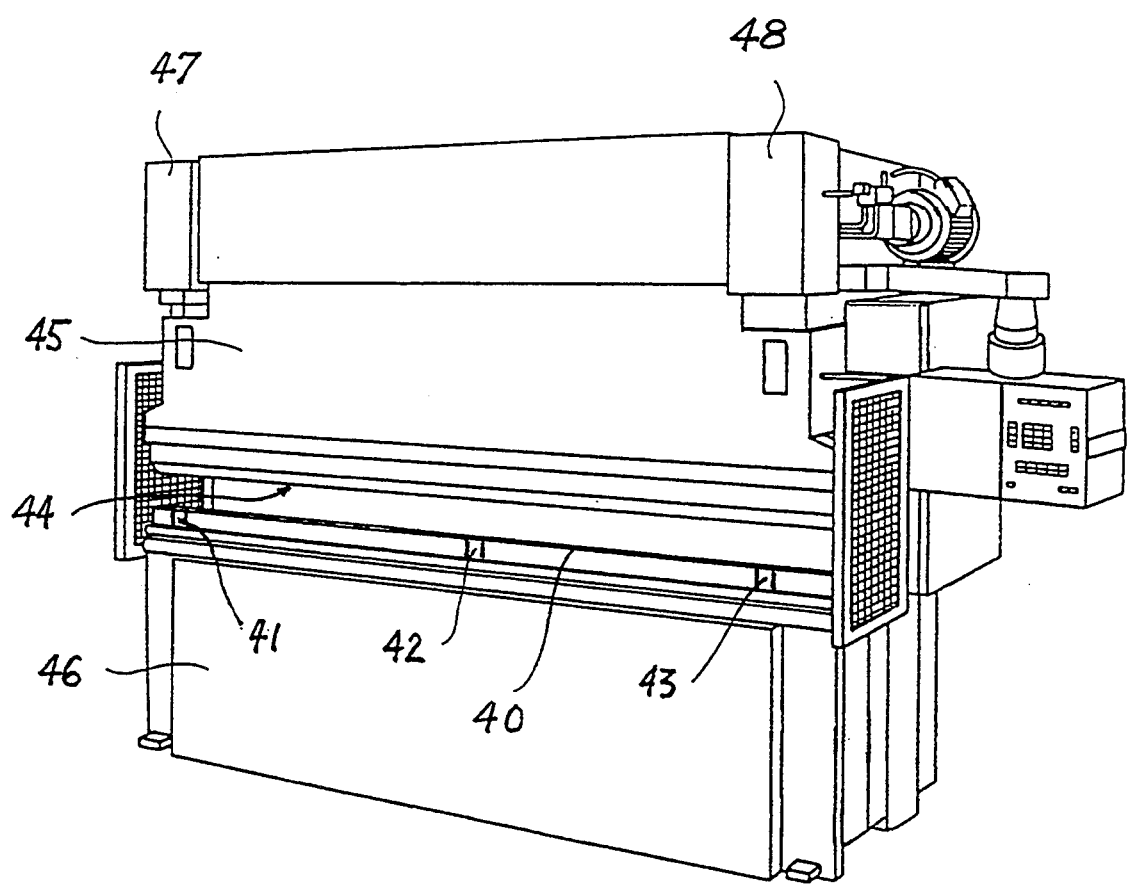
FIG. 3 is a schematic general view of a press brake provided with measuring devices according to the invention.

In the press brake for bending sheet-metal shown in FIG. 3, measuring devices 41, 42, 43 are inserted in the die 40 of the press, for example, at three places spaced over the length of that die, namely near the ends and in the center, in such a way that their grooves 13 are in alignment with the grooves of the die portions of the press between which the die members of the measuring devices are arranged. FIG. 3 shows a horizontally oriented punch 44 supported in an upper frame 45 of the press, the die 40 being supported by a lower frame 46 of the press. Punch 44 is actuated by hydraulic jacks 47, 48.

In a bending operation, the workpiece of sheet-metal to be bent is placed on the upper surface of the die of the press, then the punch 44 is moved downwardly for bending the sheet into V-shape, as represented by way of example in FIG. 1 by the sheet-metal portion 16 shown by dot-dash lines. The bending is effected in the usual manner between the sharp edge of the punch, not shown in FIG. 1, and the bending edges of the die which are in alignment with the edges 11 and 12 of the grooves 13 of the die members of the measuring devices 41, 42, 43.

The support of the measuring disc is lodged in an opening 25 of the die member 10 so as to be able to be shifted in a direction inclined with respect to the plane 17, 17'. In the rest state, the support 5 is brought into a position defined by a stop 26 through return means 18. Prior to the measuring of the bend angle, the support 5 is shifted towards groove 13 by an actuating device 24 comprising, for example, a pneumatic jack. The end position in this direction is defined by a stop 27 forming the end of the opening 25.

Figure 2:
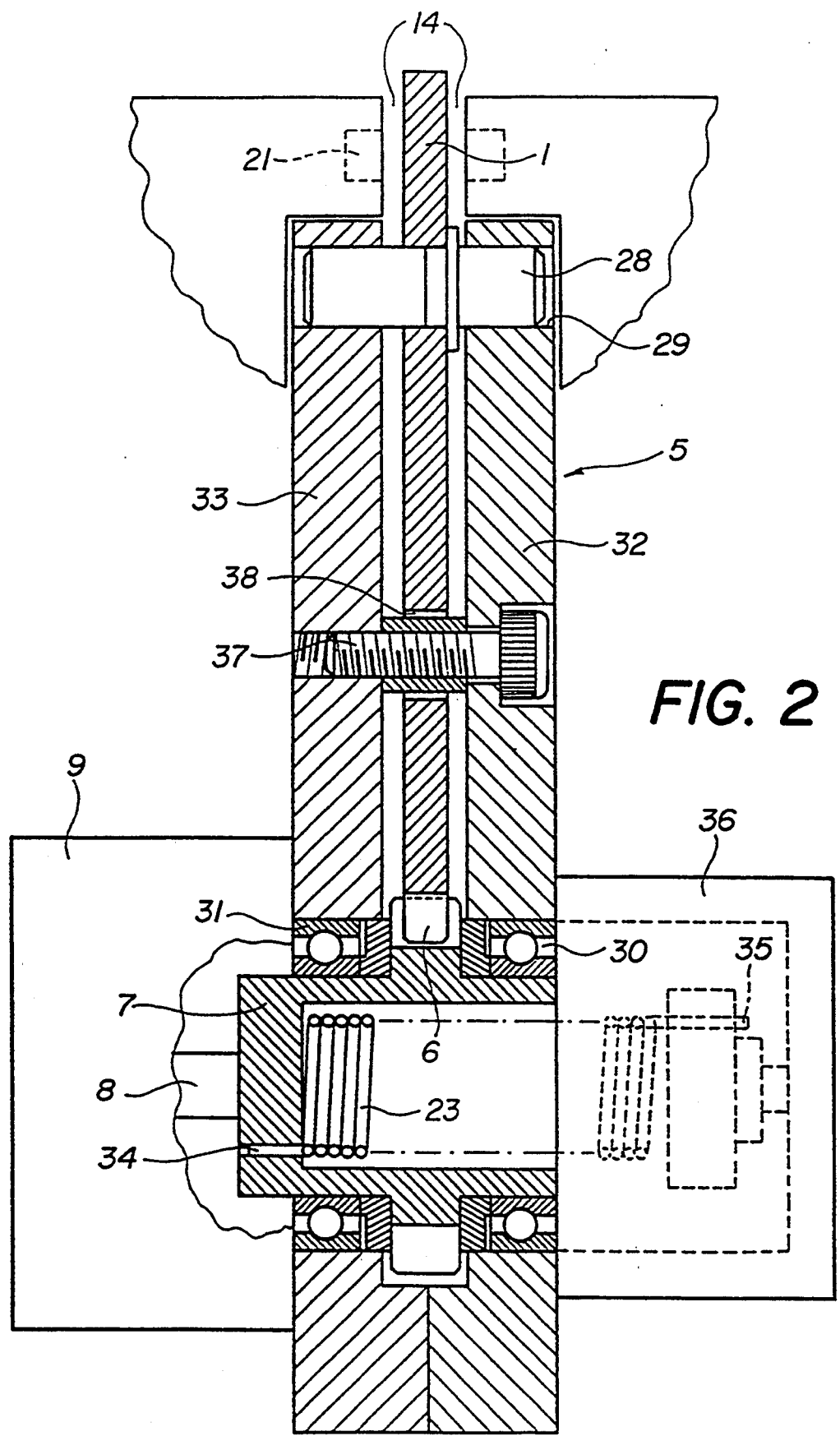
FIG. 2 is an enlarged view, partially in section, of the measuring disc and its support being part of the device according to FIG. 1.

As shown in FIG. 2, the measuring disc 1 is mounted on an axis 28 supported at 29 in the support 5. The circular peripheral part of the disc comprises a series of teeth 6 which extend over an appropriate length of its periphery and are engaged with a pinion 7, mounted for rotation in the support 5 by means of bearings 30, 31 arranged in this embodiment in two parts 32, 33 of the support 5. A helicoïdal spring 23 is lodged in a bore of pinion 7, while the ends 34 and 35 of this spring are attached, respectively, to pinion 7 and to a support part 36 which is fixed to the part 32 of the support 5.

An electric potentiometer 9 having a rotating wiper, is actuated by a shaft 8 integral with pinion 7. Therefore, the angular position of disc 1 with respect to the support 5, is represented by the angular position of the wiper of potentiometer 9 and can thus be seized as an electric signal in a usual measuring device connected to the potentiometer 9 by conductors not represented. It is to be noted that, in the shown example, the angle of rotation of the brush of potentiometer 9 is multiplied with respect to the angle of rotation of disc 1, according to the ratio of the diameters of the disc 1 and of the pinion 7.

FIG. 2 shows means for limiting the angle of rotation of disc 1 with respect to the support 5 in both directions, these means comprising a screw 37 passing through an arc-shaped slot 38 in the disc 1.

When a sheet of metal to be bent is placed on the supporting surface of the die of the press, the lower surface of the sheet thus corresponding to the plane 17, 17', the pneumatic actuating device 24 is activated for moving the support 5 from its rest position towards a position in which the central portion 15 of the linear peripheral part of disc 1 tends to project out from slot 14 of the die member 10. The position shown in FIG. 1 represents the end position which the disc would occupy in the absence of a sheet of metal on the supporting surface of the die. When a plane sheet of metal is present, the part 4 comes into contact with the lower surface of the same and will thus be situated in the plane 17, 17'. When the punch of the press bends the sheet-metal, so that the same penetrates into the groove 13 of the die member 10, the measuring disc 1 is rotated around its axis 3 since the part 4 remains in contact with the outer surface of the metal sheet. In certain cases, it is desired to make sure, in particular, that the disc 1 is primarily in contact with the portion of the sheet 16 which is outside the groove 13, since the zone of contact with this portion always extends up to the end of the part 4 of the disc. To achieve this, a hydraulic or pneumatic jack, not shown, can for example be arranged to be effective during the measuring operation, so as to rotate the pinion 7 in the opposite direction with respect to spring 23 with a greater force than that of this spring. It is to be noted that the return force of spring 23 alone, or, respectively, the force resulting from the action of spring 23 and of a jack provided as mentioned above, will also avoid a possible play between the teeth of disc 1 and of pinion 7.

At the end of the bending operation, the actuating device 24 is switched off and the return spring 18 brings the support 5 of the disc 1 back to its rest position. The return spring 23 brings the disc 1 back into its angular rest position which corresponds to the angular position shown in full lines in FIG. 1.

Grooves 20, 21 and 22 arranged near the edges of the die member 10 forming the slot 14 are shown in FIG. 1 by dashed lines. These grooves are fed with compressed air through a supply conduct 19 and produce, on the one hand, a cleaning of the slot 14 and, on the other hand, a centering of the disc 1 inside this slot.

It will be apparent from the preceding description that the present measuring device can be made in a relatively simple way and allows to achieve a high degree of reliability and precision. By adapting the shape of the groove 13 of the die member, the device can easily be applied to different dies of press brakes. It will be recognized that the great measuring precision of the present device will not be affected by the operating conditions which exist on a brake press and will only require a minimum of inspection and maintenance.

I claim:

1. A measuring device for the bend angle of a sheet-like workpiece in a press brake of the type having a reciprocable punch and a fixed die with a substantially V-shaped groove, said measuring device comprising a rotatory measuring element which has, in cross-section, a circular peripheral part centered around the axis of rotation of the measuring element, and a linear peripheral part which is shorter than the diameter of said circular peripheral part, the measuring element having the shape of a flat disc of small thickness as compared to its dimensions in its plane, said disc being mounted for rotation over a limited angle in a disc support, said disc support comprising means for sensing the angular position of the disc and for providing a measuring signal related thereto, said device further comprising a die member with a substantially V-shaped groove having a slot arranged transversally to said groove for receiving said measuring disc, said disc support being arranged in said die member so as to be capable of effecting a translatory movement between a position in which a central portion of the linear peripheral part of said measuring disc is inside said slot in the vicinity of an edge of said V-shaped groove of said die member, and a position in which said central portion is outside said slot, the arrangement being such that said linear peripheral part of the measuring disc is brought into contact with a workpiece placed on said die member during a bend operation, so that the angular position of the disc represents the instantaneous bend angle of the workpiece.

2. A device according to claim 1 wherein said support of the measuring disc and said die member are arranged for permitting a linear shifting of said support in a direction inclined with respect to a plane which includes the edges of said V-shaped groove of the die member.

3. A device according to claim 2 wherein said support of the measuring disc is subjected to the action of return means tending to bring the same into said rest position in which said central portion of the linear peripheral part of the measuring disc is inside said slot, and wherein actuating means are arranged for tending to bring said central portion to the outside of said slot when the measuring takes place.

4. A device according to claim 1 wherein a portion of said circular peripheral part of the measuring disc has teeth engaged with the pinion mounted in the disc support, said pinion being coupled with a sensor of its angular position and being subjected to the action of a return spring tending to rotate said measuring disc to a position in which said linear peripheral part of the disc extends outside said slot in the die member groove.

5. A device according to claim 1 comprising means tending to rotate said measuring disc so as to apply the linear peripheral part thereof to the surface of the workpiece situated outside said groove of the die member.

6. A device according to claim 4, comprising means tending to rotate said measuring disc so as to apply the linear peripheral part thereof to the surface of the workpiece situated outside said groove of the die member.

7. A device according to claim 1 wherein said die member comprises means for blowing air along both sides of said slot in which said measuring disc is arranged.

8. A press brake for bending sheet-like metallic workpieces, having a reciprocable punch and a fixed die with a substantially V-shaped groove and including at least two measuring devices for the bend angle of a workpiece arranged in spaced positions along the die of the press, each measuring device comprising a rotatory measuring element which has, in cross-section, a circular peripheral part centered around the axis of rotation of the measuring element, and a linear peripheral part which is shorter than the diameter of said circular peripheral part, the measuring element having the shape of a flat disc of small thickness as compared to its dimensions in its plane, said disc being mounted for rotation over a limited angle in a disc support, said disc support comprising means for sensing the angular position of the disc and for providing a measuring signal related thereto, said device further comprising a die member with a substantially V-shaped groove having a slot arranged transversally to said groove for receiving said measuring disc, the die members of said measuring devices being inserted between adjacent portions of the die of the press in such a way that the V-shaped grooves of the die members of said measuring devices are positioned in alignment with the V-shaped groove of the die of the press, said disc support being arranged in said die member so as to be capable of effecting a translatory movement between a position in which a central portion of the linear peripheral part of said measuring disc is inside said slot in the vicinity of an edge of said V-shaped groove of said die member, and a position in which said central portion is outside said slot, the arrangement being such that said linear peripheral part of the measuring disc is brought into contact with a workpiece placed on said die member during a bend operation, so that the angular position of the disc represents the instantaneous bend angle of the workpiece at the place of each measuring device.

* * * * *